United States Patent [19]
Maxwell et al.

[11] Patent Number: 6,011,085
[45] Date of Patent: Jan. 4, 2000

[54] YELLOW, HOT MELT ALKYD TRAFFIC MARKING COMPOSITIONS

[75] Inventors: Brian E. Maxwell, Johnson City; Max A. Weaver, Kingsport; Gary R. Robe, Kingsport; Richard A. Miller, Kingsport, all of Tenn.

[73] Assignee: Eastman Chemical Company, Kingsport, Tenn.

[21] Appl. No.: 09/096,535

[22] Filed: Jun. 12, 1998

Related U.S. Application Data

[60] Provisional application No. 60/049,561, Jun. 13, 1997, provisional application No. 60/049,562, Jun. 13, 1997, provisional application No. 60/049,563, Jun. 13, 1997, and provisional application No. 60/061,621, Oct. 9, 1997.

[51] Int. Cl.[7] .................................. F21V 7/22; C08J 9/32; C08K 5/36; C08K 5/08; C08L 67/00
[52] U.S. Cl. .................. 523/172; 523/218; 523/219; 523/507; 524/358; 524/513; 524/603
[58] Field of Search ....................... 523/172, 507, 523/218, 219; 524/358, 513, 603

[56] References Cited

U.S. PATENT DOCUMENTS

| | | | |
|---|---|---|---|
| 3,337,483 | 8/1967 | Searight et al. | 523/172 |
| 3,424,708 | 1/1969 | Bowman et al. | 524/718 |
| 3,523,029 | 8/1970 | Searight et al. | 106/237 |
| 3,619,224 | 11/1971 | Inamoto et al. | 106/240 |
| 3,891,451 | 6/1975 | Okazaki et al. | 523/172 |
| 3,897,378 | 7/1975 | Scohy et al. | 523/172 |
| 3,935,158 | 1/1976 | Watanabe | 523/172 |
| 3,998,645 | 12/1976 | Okazaki et al. | 106/30 |
| 4,025,476 | 5/1977 | Miller et al. | 523/172 |
| 4,031,048 | 6/1977 | Holmen et al. | 523/172 |
| 4,105,808 | 8/1978 | McKenzie | 427/137 |
| 4,144,068 | 3/1979 | Ishibashi et al. | 96/60 |
| 4,297,450 | 10/1981 | Sato et al. | 523/333 |
| 4,301,050 | 11/1981 | Masuda et al. | 523/172 |
| 4,324,711 | 4/1982 | Tanaka et al. | 523/172 |
| 4,406,706 | 9/1983 | Dale | 106/288 |
| 4,436,845 | 3/1984 | Kitano | 523/172 |
| 4,458,010 | 7/1984 | Yamamuro et al. | 430/393 |
| 4,506,007 | 3/1985 | Nakajima et al. | 430/393 |
| 4,596,666 | 6/1986 | Blunck et al. | 252/299 |
| 4,892,922 | 1/1990 | Weaver et al. | 528/190 |
| 5,102,980 | 4/1992 | Krutak et al. | 528/272 |
| 5,194,571 | 3/1993 | Weaver et al. | 528/272 |
| 5,213,439 | 5/1993 | De Keyzer | 404/12 |
| 5,478,596 | 12/1995 | Gurney | 427/137 |
| 5,672,379 | 9/1997 | Schall et al. | 427/137 |
| 5,709,908 | 1/1998 | Gurney | 427/137 |

FOREIGN PATENT DOCUMENTS

| | | |
|---|---|---|
| 2221502 | 10/1974 | France . |
| WO92/13921 | 8/1992 | WIPO . |
| WO97/22255 | 6/1997 | WIPO . |

*Primary Examiner*—Peter A. Szekely
*Attorney, Agent, or Firm*—Rose M. Allen; Harry J. Gwinnell

[57] ABSTRACT

A yellow, hot melt alkyd traffic marking composition is described. The yellow, hot melt alkyd traffic marking composition contains 10–25 percent by weight of a hot melt alkyd binder, 5–10 percent by weight of a thermally stable 1,5- or 1,8-substituted anthraquinone colorant selected from a 1,5- or 1,8-substituted anthraquinone aromatic thioether and a 1,5- or 1,8-substituted anthraquinone aromatic thioether polyester, and 65–85 weight percent of a filler. The yellow, hot melt alkyd traffic marking composition of the invention may also contain other components used in traffic marking compositions, such as a reflectivity aid, a plasticizer, or an impact modifier. Other optional components are discussed below. The yellow, hot melt alkyd traffic marking compositions may be applied to any paved surface.

6 Claims, No Drawings

YELLOW, HOT MELT ALKYD TRAFFIC MARKING COMPOSITIONS

PRIORITY DATA

This application claims benefit under 35 U.S.C. § 119 of provisional applications 60/049,561; 60/049,562; and 60/049,563, all filed Jun. 13, 1997, and of provisional application 60/061,621, filed Oct. 9, 1997. Each of these provisional applications are incorporated herein by reference.

FIELD OF THE INVENTION

The invention relates to yellow, hot melt alkyd traffic marking compositions. More particularly, the invention relates to yellow, hot melt marking compositions containing a 1,5- or 1,8-substituted anthraquinone aromatic thioether or polyester. These yellow, hot melt alkyd traffic marking compositions are generally used to mark paved surfaces, such as roadways.

BACKGROUND OF THE INVENTION

White and yellow traffic markings used for demarcating traffic lanes is a common sight on almost all roads. These markings ensure safe driving conditions under varying weather conditions. As described in U.S. Pat. Nos. 3,337, 483 and 3,523,029, these white and yellow markings are formed from thermoplastic marking compositions which contain a hydrocarbon resin, fillers, a white or yellow pigment or dye, and glass beads. These marking compositions are applied to a surfaces, such as a road, as a hot melt Upon application, the marking compositions form a layer on the surface of the pavement which is allowed to cool to ambient temperature so that a solidified layer is formed within a short period of time. The compositions are generally applied to the pavement of roads, parking lots, sidewalks and runways. Other exemplary traffic marking compositions are described in U.S. Pat. Nos. 3,897,378; 3,998, 645; 4,025,476; 4,324,711; 4,406,706; 5,213,439; and 5,709, 908.

At the present time large amounts of thermoplastic marking compositions are used for yellow traffic marking purposes. The conventional coloring component which has generally been incorporated in the yellow thermoplastic traffic paints, is lead chromate or cadmium yellow pigment alone or mixed with coated chrome yellow pigment. These pigments are used in large quantities, for example, two pounds of lead chromate are used per gallon of marking composition. Unfortunately, these pigments contain the lead, cadmium and chromium heavy metals which are toxic to the environment. Thus, while desirable from a color point of view, these heavy metal pigments are discouraged due to their toxic nature. Indeed, with the increasing environmental concern surrounding the use of heavy metal pigments in paints and coatings, there is a push to replace heavy metals in hot melt marking compositions with organic pigments or dyes. Many states, such as California and Texas, have already mandated that lead chromate is to be replaced where possible. Consequently, efforts are being made to utilize other colorant materials; ie., nontoxic pigments and dyes, for yellow traffic marking paint purposes.

The efforts to replace the heavy metal pigments have not been successful as severe requirements are imposed on the performance of the thermoplastic marling compositions, and consequently on the property of colorants which they contain. For example, a fairly high resistance to heat is required, because the thermoplastic marking compositions are applied after they are melted by heating. Moreover, a weathering resistance which is durable for more than one year is also very essential as the thermoplastic marking composition are typically used outdoors.

Previous attempts to formulate hot melt marking compositions containing organic dyes have not met with success. For example, both U.S. Pat. No. 3,337,483 and U.S. Pat. No. 3,523,029 describe hot melt marking compositions containing a coloring agent, such as Benzidine Yellow and Benzidine Orange. Unfortunately, Benzidine colorants and their intermediates are highly toxic and are suspected to be carcinogenic. Thus, there exists a need in the art for a hot melt marking composition which is non-toxic and safe to the environment.

SUMMARY OF THE INVENTION

The invention provides a yellow, hot melt alkyd traffic marking composition which utilizes a colorant system which is non-toxic and safe to the highway workers and will not contribute to ground water contamination with heavy metals. More particularly, the invention relates to the use of yellow 1,5- or 1,8-substituted anthraquinone aromatic thioethers and 1,5- or 1,8-substituted anthraquinone aromatic thioether polyesters in traffic marking compositions. Accordingly, a yellow, hot melt alkyd traffic marking composition of the invention contains 10–25 percent by weight of a hot melt alkyd binder, 5–10 percent by weight of a thermally stable 1,5- or 1,8-substituted anthraquinone colorant selected from a 1,5- or 1,8-substituted anthraquinone aromatic thioether and a 1,5- or 1,8-substituted anthraquinone aromatic thioether polyester, and 65–85 weight percent of a filler. A yellow, hot melt alkyd traffic marking composition may also contain other components used in traffic marking compositions, such as a reflectivity aid, a plasticizer, or an impact modifier. Other optional components are discussed below. Yellow, hot melt alkyd traffic marking compositions of the invention may be applied to any paved surface. The invention is discussed in more detail below.

DETAILED DESCRIPTION OF THE INVENTION

The invention relates to a yellow, hot melt alkyd traffic marking composition. The traffic marking composition may be applied to any type of road or paved surface. Examples of these surfaces include roads, highways, exit and entry ramps, overpasses, pavements, side walks or parking lots for vehicles, such as, autos, bikes, trucks, etc. Preferably, the paved surface is a porous surface such as an asphalt or concrete surface. A tic marking composition of the invention contains a binder, a thermally stable 1,5- or 1,8-substituted anthraquinone colorant selected from a 1,5- or 1,8-substituted anthraquinone aromatic thioether and a 1,5- or 1,8-substituted anthraquinone aromatic thioether polyester, and an inert filler.

A yellow, hot melt alkyd traffic marking composition of the invention contains 10–25 weight percent of a hot melt alkyd binder. Preferably, the binder is present in 18–22 weight percent. Any typical hot melt alkyd, (for example, a short, medium or long oil alkyd, an acrylic-modified alkyd, or a uralkyd), may be used as the binder in a traffic marking composition of the invention. An exemplary alkyd which may be used is a Pentanox resin, available from Pentagon Chemicals, Ltd. The hot melt alkyd binder should have a softening point ranging from about 90–110° C.

A thermally stable 1,5- or 1,8-substituted anthraquinone aromatic thioether or 1,5- or 1,8-substituted anthraquinone aromatic thioether polyester comprises the colorant of a yellow, hot melt alkyd traffic marking composition of the invention. This colorant is present in 3–10 weight percent of the composition, preferably 5–8 weight percent A "thermally stable" 1,5- or 1,8-substituted anthraquinone aromatic thioether or 1,5- or 1,8-substituted anthraquinone aromatic thioether polyester is able to withstand at least 400° F. for five hours. Preferred 1,5- or 1,8-substituted anthraquinone aromatic thioethers and 1,5- or 1,8-substituted anthraquinone aromatic thioether polyesters are those that remain stable at 500° F. for five hours. The 1,5- or 1,8-substituted anthraquinone aromatic thioether or 1,5- or 1,8-substituted anthraquinone aromatic thioether polyester should also have good resistance to fading upon prolonged exposure to sunlight.

Thermally stable 1,5- or 1,8-substituted anthraquinone aromatic thioethers usefull in a yellow, hot melt alkyd traffic marking composition of the invention are those of formula I:

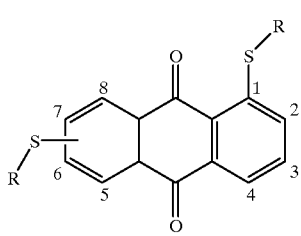

In formula I, R is

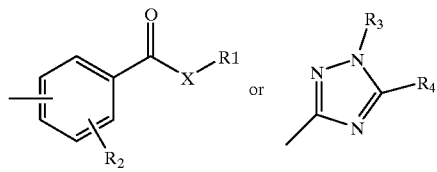

where R1 represents a branched or unbranched saturated hydrocarbon radical containing 6–20 carbon atoms and optionally containing one or more heteroatoms selected from oxygen, sulfur and nitrogen or a substituted phenyl group having the structure:

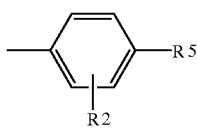

R2 is selected from hydrogen, $C_1$–$C_6$ alkyl, $C_1$–$C_6$ alkoxy, halogen or —COXR1; R3 represents a branched or unbranched saturated hydrocarbon radical contaning 6–20 carbon atoms and optionally containing one or more heteroatoms selected from oxygen, sulfur and nitrogen; R4 is selected from hydrogen, $C_3$–$C_8$ cycloalkyl, $C_1$–$C_6$ alkyl and aryl; X is selected from —O—, —N(R1)— and —N(R4)—; R5 represents R3, —O—R3, —S—R3, —N(R1)R3, or —N(R4)R3.

Preferred compounds of Formula I are those where R is:

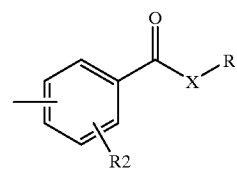

and wherein X is O—; R1 represents a branched or unbranched saturated hydrocarbon radical of 8–12 carbon atoms; R2 is hydrogen. Examples of various 1,5- and 1,8-substituted anthraquinone aromatic thioethers useful in a hot melt alkyd traffic marking composition are shown in Table 1.

TABLE 1

| Compound Number | Position | R |
|---|---|---|
| 1 | 1,5-bis | —C$_6$H$_4$—C(O)O—CH$_2$CH(C$_2$H$_5$)(CH$_2$)$_3$CH$_3$ |
| 2 | 1,8-bis | —C$_6$H$_4$—C(O)O—CH$_2$CH(C$_2$H$_5$)(CH$_2$)$_3$CH$_3$ |
| 3 | 1,5-bis | —C$_6$H$_4$—CONH(CH)$_3$O(CH$_2$)$_5$CH$_3$ |
| 4 | 1,5-bis | —C$_6$H$_4$—CO$_2$(CH$_2$)$_{11}$CH$_3$ |
| 5 | 1,8-bis | —C$_6$H$_3$(CO$_2$CH$_2$CH(C$_2$H$_5$)(CH$_2$)$_3$CH$_3$)$_2$ |

TABLE 1-continued

[Structure: anthraquinone with S-R at position 1 and S-R on other ring]

| Compound Number | Position | R |
|---|---|---|
| 6 | 1,5-bis | 3-methyl-benzene with CONH(CH$_2$)$_3$CH$_3$ and CONH(CH$_2$)CH$_3$ substituents |
| 7 | 1,5-bis | 3-methyl-benzoyl-NH-(4-(CH$_2$)$_7$CH$_3$-phenyl) |
| 8 | 1,5-bis | 2-methyl-benzoyl-O-N(CH$_3$)(CH$_2$)$_{11}$CH$_3$ |
| 9 | 1,5-bis | 2-methyl-benzoyl-O-(4-(CH$_2$)$_{11}$CH$_3$-phenyl) |
| 10 | 1,5-bis | 4-methyl-benzoyl-O-(CH$_2$)$_3$SCH$_2$CH(CH$_3$)$_2$ |
| 11 | 1,5-bis | 4-methyl-benzene-CON(C$_4$H$_9$n)CH$_2$CH(C$_2$H$_5$)(CH$_2$)$_3$CH$_3$ |
| 12 | 1,5-bis | 2-methyl-benzoyl-N[(CH$_2$)$_5$CH$_3$]$_2$ |
| 13 | 1,5-bis | 2-methyl-benzoyl-O(CH$_2$)$_{19}$CH$_3$ |
| 14 | 1,5-bis | 2-methyl-benzoyl-N(C$_6$H$_{11}$)(CH$_2$)$_7$CH$_3$ |
| 15 | 1,5-bis | 3-methyl-benzene-1,4-bis(C(=O)O(CH$_2$)$_9$CH$_3$) |
| 16 | 1,8-bis | 3-methyl-1,2,4-triazol-1-yl-CH$_2$CH(CH$_2$H$_5$)(CH$_2$)$_3$CH$_3$ |
| 17 | 1,5-bis | 3,5-dimethyl-1,2,4-triazol-1-yl-(CH$_2$)$_7$CH$_3$ |

TABLE 1-continued

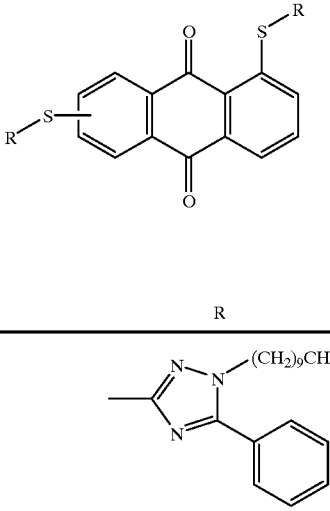

| Compound Number | Position | R |
|---|---|---|
| 18 | 1,5-bis | 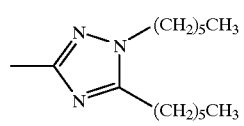 |
| 19 | 1,8-bis | 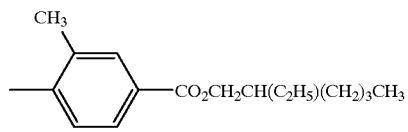 |
| 20 | 1,5-bis | 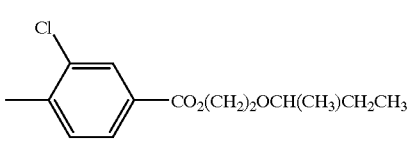 |
| 21 | 1,5-bis | 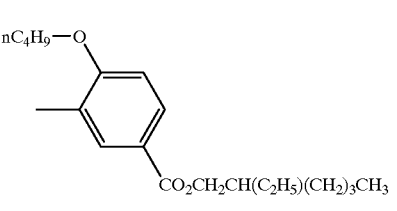 |
| 22 | 1,5-bis | 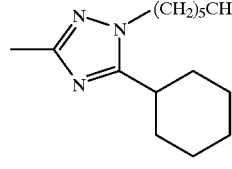 |
| 23 | 1,5-bis | 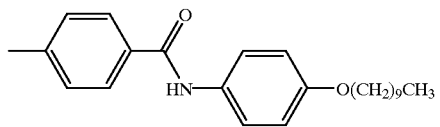 |
| 24 | 1,8-bis | 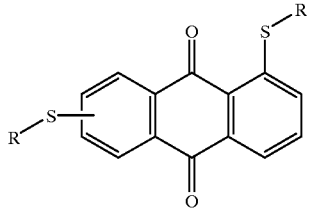 |

TABLE 1-continued

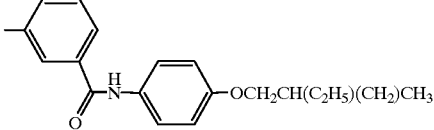

| Compound Number | Position | R |
|---|---|---|
| 25 | 1,5-bis | 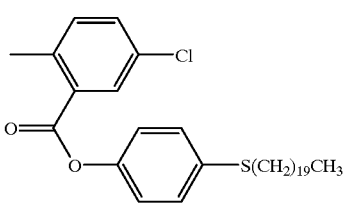 |
| 26 | 1,5-bis |  |
| 27 | 1,5-bis |  |

The 1,5- or 1,8-substituted anthraquinone compounds of formula I may be prepared from the corresponding 1,5- or 1,8-dichloroanthraquinones by displacement of chlorine with aromatic thiolate anions using standard techniques. Preferably, the reaction takes place at elevated temperatures in a high boiling polar solvent such as, for example, dimethylformamide (DMF), N-methyl-2-pyrrolidone (NMP), or diethylene glycol monopropyl ether.

Thermally stable 1,5- or 1,8-substituted anthraquinone aromatic thioether polyesters useful in the invention are those having a 1,5- or 1,8-substituted anthraquinone repeating unit from formula I above where R is:

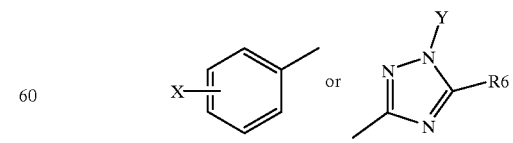

where X is selected from $-CO_2R7$, $-(CH_2)_nCO_2R7$, $O(CH_2)_nCO_2R7$, $-(CH_2CH_2O)_mR8$, and $-(OCH_2CH_2)OR8$; Y is selected from $-(CH_2)_nCO_2R7$, $-CH_2-C_6H_4-CO_2R7$, and $-(CO_2CH_2O)_mR8$; R6 is selected from hydrogen, $C_1-C_6$ alkyl, and aryl; R7 is selected from hydrogen $C_1-C_6$ alkyl, substituted $C_1-C_6$ alkyl, $C_3-C_8$ cycloalkyl, and aryl; R8 is selected from hydrogen and $C_1-C_6$ alkanoyloxy; m ranges from 1–3; and n ranges from 1–4. With the proviso that two polyester reactive groups selected from hydroxy, carboxy, carboxylic acid ester, and $C_1-C6$ alkoyloxy are present. Exemplary 1,5- or 1,8-substituted anthraquinone aromatic thioether monomers are shown below in Table 2.

TABLE 2

| Compound Number | Position | R |
|---|---|---|
| 28 | 1,5-bis | 2-($HO_2C$)phenyl |
| 29 | 1,5-bis | 4-($CO_2CH_3$)phenyl |
| 30 | 1,8-bis | 3-($CO_2H$)phenyl |
| 31 | 1,5-bis | 4-($CH_2CO_2H$)phenyl |
| 32 | 1,8-bis | 4-($OCH_2CH_2OH$)phenyl |
| 33 | 1,5-bis | 4-($C_2H_4OH$)phenyl |
| 34 | 1,5-bis | 4-($OCH_2CO_2H$)phenyl |

TABLE 2-continued

| Compound Number | Position | R |
|---|---|---|
| 35 | 1,5-bis | 4-($OCH_2CO_2CH_3$)phenyl |
| 36 | 1,5-bis | 4-($OCH_2CH_2-O-C(O)CH_3$)phenyl |
| 37 | 1,5-bis | 4-($OCH_2CH_2CO_2C_2H_5$)phenyl |
| 38 | 1,5-bis | 4-($(OCH_2CH_2)_2-OH$)phenyl |
| 39 | 1,8-bis | 4-($(OCH_2CH_2)_2-O-C(O)CH_3$)phenyl |
| 40 | 1,5-bis | 4-($O(CH_2)_4CO_2H$)phenyl |
| 41 | 1,5-bis | 4-($CO_2CH_2CH_2OH$)phenyl |
| 42 | 1,5-bis | 2-($n-C_4H_9O_2C$)phenyl |
| 43 | 1,5-bis | 3-methyl-1-($CH_2CH_2OH$)-1,2,4-triazole |

TABLE 2-continued

Structure: anthraquinone with SR substituents at 1,8- or 1,5-positions

| Compound Number | Position | R |
|---|---|---|
| 44 | 1,8-bis | 3-methyl-1,2,4-triazol-1-yl—(CH$_2$)$_4$OH |
| 45 | 1,5-bis | 3-methyl-1,2,4-triazol-1-yl—CH$_2$CO$_2$CH$_3$ |
| 46 | 1,5-bis | 3,5-dimethyl-1,2,4-triazol-1-yl—CH$_2$CH$_2$OCH$_2$CH$_2$OH |
| 47 | 1,8-bis | 3-methyl-5-phenyl-1,2,4-triazol-1-yl—CH$_2$CH$_2$OH |
| 48 | 1,5-bis | 3-methyl-1,2,4-triazol-1-yl—CH$_2$CH$_2$—O—C(=O)CH$_3$ |
| 49 | 1,5-bis | 3-methyl-5-cyclohexyl-1,2,4-triazol-1-yl—(CH$_2$)$_4$CO$_2$CH$_3$ |
| 50 | 1,5-bis | 3-methyl-1,2,4-triazol-1-yl—CH$_2$—C$_6$H$_4$—CO$_2$CH$_3$ |
| 51 | 1,8-bis | 3-methyl-1,2,4-triazol-1-yl—(CH$_2$CH$_2$O)$_3$H |
| 52 | 1,5-bis | 3-methyl-1,2,4-triazol-1-yl—CH$_2$—C$_6$H$_4$—CO$_2$H |
| 53 | 1,5-bis | 3-methyl-1,2,4-triazol-1-yl—CH$_2$—C$_6$H$_4$—CO$_2$C$_2$H$_4$OH |
| 54 | 1,8-bis | 3-methyl-1,2,4-triazol-1-yl—CH$_2$CH$_2$—O—C(=O)CH(CH$_3$)$_2$ |
| 55 | 1,5-bis | 3-methyl-1,2,4-triazol-1-yl—CH$_2$CO$_2$C$_6$H$_{11}$ |
| 56 | 1,5-bis | 3-methyl-1,2,4-triazol-1-yl—CH$_2$CO$_2$C$_6$H$_5$ |
| 57 | 1,5-bis | 3-methyl-1,2,4-triazol-1-yl—(CH$_2$)$_6$CO$_2$C$_2$H$_5$ |

The 1,5- or 1,8-substituted anthraquinone aromatic thioether polyesters contain sufficient anthraquinone repeating units to provide the desired yellow color, generally at least about 10 weight percent of the anthraquinone repeating unit in the polyester. Preferably, the polyester contains 20–30 weight percent of the anthraquinone repeating unit.

The 1,5- or 1,8-substituted anthraquinone aromatic thioether polyesters may be prepared by reacting the anthraquinone with a polycarboxylic acid and polyol under polycondensation condtions as with other polyesters. The preparation of 1,5- and 1,8-substituted anthraquinone aromatic thioether polyesters is described in U.S. Pat. No. 3,424, 708; U.S. Pat. No. 4,892,922; U.S. Pat. No. 5,102, 980; and PCT applications WO 92/13921 and WO 97/22255; each of which is incorporated herein by reference.

Suitable diol components of the 1,5- or 1,8-substituted anthraquinone aromatic thioether polyesters may be selected, for example, from ethylene glycol, 1,4-cyclohexanedimethanol, 1,2-propanediol, 1,3-propanediol, 1,4-butanediol, 2,2-dimethyl-1,3-propanediol, 1,6-hexanediol,1,2-cyclohexanediol, 1,4-cyclohexanediol, 1,2-cyclohexanedimethanol,1,3-cyclohexanedimethanol, Z,8-bis(hydroxymethyl)-tricyclo-[5.2.1.0]-decane where Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

Suitable acid components (aliphatic, alicyclic, or aromatic dicarboxylic acids) of the 1,5- or 1,8-substituted anthraquinone aromatic thioether polyesters are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The 1,5- or 1,8-substituted anthraquinone aromatic thioether polyesters may be prepared according to polyester forming conditions well known in the art For example, a mixture of one or more dicarboxylic acids, preferably aromatic dicarboxylic acids, or ester forming derivatives thereof, and one or more diols may be heated in the presence of esterification and/or polyesterification catalysts at temperatures in the range of about 150° to about 300° C., and pressures of atmospheric to about 0.2 mm Hg. Normally, the dicarboxylic acid or derivative thereof is esterified or transesterified with the diol(s) at atmospheric pressure and at a temperature at the lower end of the specified range. Polycondensation then is effected by increasing the temperature and lowering the pressure while excess diol is removed from the mixture.

In the above definitions, the term "$C_1-C_6$ alkyl" is used to represent a saturated hydrocarbon radical containing one to six carbon atoms, either straight or branched chain. The term "$C_1-C_6$ alkoxy" is used to represent a group —O—($C_{1-C6}$) alkyl. The term "$C_{3-C8}$ cycloalkl" is used to represent a saturated cyclic hydrocarbon radical containing three to eight carbon atoms. The term "aryl" is used to represent phenyl and phenyl substituted with $C_1-C_6$ alkyl, $C_1-C_6$ alkoxy or halogen. The term halogen is used to represent fluorine, chlorine, bromine and iodine.

In a preferred embodiment, the anthraquinone colorant may be first be dispersed in a linear or branched water-dipsersible polyester, such as described in U.S. Pat. No. 4,946,932 and 4,939,233. Branched water-dispersible polyesters are described in U.S. Pat. No. 5,543,488, which is incorporated herein by reference. Branched water-dispersible polyesters offer advantages over linear water-dispersible polyesters as they generally have lower viscosities allowing them to blend more rapidly with the 1,5- and 1,8-substituted anthraquinone colorant and other ingredients in a traffic marking composition of the invention. Examples of water-disersible polyesters useable in this invention include Eastman AQ-375 and Eastman AQ-1350 polyesters available from Eastman Chemical Company, Kingsport, Tenn. To disperse the 1,5- or 1,8-substituted anthraquinone colorant in a water-dispersible polyester, the colorant and polyester may be mixed with heating until a continous phase is formed. The ratio of colorant to polyester may range from 1:99 to 99:1. When such a dispersed colorant is used, the dispersed colorant is used in the same amounts as discussed above, i.e., 5–10 weight percent of the composition. Advantageously, use of a dispersed colorant may allow less colorant to be used For example, if 5 weight of a dispersed colorant is used, the water-dipsersible polyester may preferably be present in 4–4.9 weight percent of the composition and the 1,5- or 1,8-substituted colorant in an amount of 0.1–1 weight percent. If other pigments, such as titanium dioxide, are also employed in the traffic marking compositon, these pigments may be blended with the 1,5- or 1,8-substituted anthraquinone colorant and the water-dispersible polyester.

A yellow, hot melt alkyd traffic marking composition of the invention also contains 30–85 weight percent of an inert filler. Preferably, the inert filler may be present in 40–65 weight percent of the composition. Typical fillers include, but are not limited to, silica, sand, ground marble, calcium carbonate, alumina, quartzite, and diatomaceous earth. Mixtures of such fillers may also be used.

To provide specific enhancements, a yellow, hot melt alkyd traffic marking composition of the invention may contain other typical ingredients used in traffic marking compositions. For example, a yellow, hot melt alkyd traffic marking composition of the invention may contain up to 30 weight percent of a reflectivity aid such as a glass beads, plastic beads, or plastic bubbles. The reflectivity aid may used in addition to or inplace of all or some of the inert filler. These reflectivity aids may in size from 16–400 mesh. Glass beads are preferred reflectivity modifiers and are preferably present in 15–25 weight percent.

One or more plasticizers may also be used in a yellow, hot melt alkyd traffic composition of the invention. Typically, a plasticizer may be present in 1–5 weight percent of the composition. Suitable plasticizers are, for example, phthalates such as dimethyl phthalate, diethyl phthalate, dibutyl phthalate, di-n-octylphthalate, di-isooctyl phthalate, di-(2-ethylhexyl)phthalate, dinonyl phthalate, isooctyl isodecyl phthalate, diisodecyl phthalate, diallyl phthalate, butyl benzyl phthalate, and dimethoxyethyl phthalate or trimellitates such as di-isooctyl mono-isodecyl trimellitate, tri-isooctyl trimellitate, tri-isodecyl trimellitate, and trioctyl trimellitate. A preferred plasticizer is dioctyl terephthalate.

An impact modifier (also known as a viscosity modifier) may be incorporated into a traffic marking composition of the invention. Generally, the impact modifier is present in up to 5 weight percent, and preferably from 2–4 weight percent Typical impact modifiers include polyethylene resins, polypropylene resins, copolyethylene-propylene resins, and the like. When used, these polyolefin resins should have a Melt Index at 190° C. of 200 or less, preferably less than 100, and more preferably less than 50. Including such waxes can also improve the processing of the traffic marking composition and dispersing of the anthraquinone aromatic thioether or polyester colorant. Epolene polymers, available from Eastman Chemical company, Kingsport, Tenn., are a preferred type of impact modifier useful in a traffic marking composition of the invention. Epolene polymers are medium to low molecular weight polyethylene or polypropylene, which may be branched or chemically modified.

Additional pigments may also be included in a traffic marking composition of the invention, as is known in the art. Typically, pigments may be present in up to 10 weight percent. For example, titanium dioxide may be added to increase opacity and brightness. Iron sulfide may be added to enhance night-time visibility, typically in about 24 weight percent To improve the longevity of the traffic marking composition, antioxidants and ultra-violet (UV) light absorbing compounds may also be added to the composition. UV light absorbing compounds can also improve the light stability of the 1,5- or 1,8-substituted anthraquinone aromatic thioether or polyester colorant. Some antioxidants which may be used are, for example, 2,6-ditertiary-butyl-para-creosol and diamylphenol. Benzophenones, such as 2,4-dihydroxybenzophenone, represent typical UV light absorbing compounds. Generally, such antioxidants and UV absorbing compounds are employed in combined levels of less than 1 weight percent and often less than 0.5 weight percent.

A yellow, hot melt alkyd traffic composition of the invention is typically prepared by intimately combining the ingredients such that the hot melt alkyd binder becomes the continuous phase. No special mixing techniques are required. A mixer capable of being heated to between about 200° C. and 400° C. is sufficient to melt blend the above ingredients within thirty minutes to one hour. As is known in the art, the temperature, heating time, and apparatus can depend on the particular composition being prepared. Typically, the traffic marking composition is melt blended on site, just before being applied to road surface. The hot melt alkyd binder is first melted, and then the 1,5- or 1,8-substituted anthraquinone aromatic thioether or polyester colorant may be added along with the filler. Any other ingredients may also be added. Alternatively, the 1,5- or 1,8-substituted anthraquinone aromatic thioether or polyester colorant may be melt blended with the hot melt alkyd and/or the impact modifier (e.g. polyethylene) if used, to produce a binder/colorant portion, generally in the form of preformed pellets or chips. These preformed pellets or chips can then be melt blended with the other ingredients of the traffic marking composition prior to use. Or, the other ingredients of the yellow, hot melt alkyd traffic composition may also be premixed to produce a filler portion. The binder/colorant portion may be melt blended with the filler portion at the point of use. Generally, 17–25 weight percent of the binder/colorant portion are combined with 65–83 weight percent of the filler portion.

The following examples are intended to illustrate, not limit, the invention. It is contemplated and understood that other hot melt alkyd binders, 1,5- or 1,8-substituted anthraquinone aromatic thioether or polyester colorants, fillers, impact modifiers, etc., as discussed above, may be used in a yellow, hot melt alkyd traffic marking composition of the invention.

EXAMPLE 1
Preparation of 1.5-bis(2-ethylbexyloxycarbonyl-1phenylthio)-9,10-anthraquinone To 5 parts 1,5-bis(2-carboxy-1-phenylthio)-9,10-anthraquinone in 50 parts 2-ethyl-1-hexanol was added 0.5 parts concentrated sulfuric acid. This mixture was stirred vigorously at 175° C. for 20 hr. During this period, the solution became clear and red in color. The mixture was allowed to cool to room temperature at which point the product crystallized. The solids were collected by filtration and washed with methanol to give 6.8 parts 1,5-bis(2-ethylhexyloxycarbonyl-1-phenylthio)-9,10-anthraquinone (95% yield).

EXAMPLE 2

To 95 parts by weight terephthalic acid (TPA), 59 parts by weight butanediol (BD), and 60 parts by weight, 1,5-bis(2-carboxy-1-phenylthio) anthraquinone (Dye) was added 75 parts per million by weight of titanium in the form of titanium tetraisopropoxide. This mixture was heated with stirring at 200° C. for 2 hrs and further heated at 220° C. for an additional two hours. During this time, water and tetrahydrofuran were generated and collected by means of a dry ice condenser. The temperature was raised to 250° C. and the pressure was lowered over a 15 min period to 0.002 psi (0.1 mm Hg). Following 35 min at this temperature and pressure, the heat was removed, the pressure was returned to atmospheric pressure and the resulting dark reddish yellow polymer was cooled. The yield of polymer is 200 parts by weight of polybutylene terephthalate) copolymerized with 30% by weight of Dye.

EXAMPLE 3

A mixture of 1,5-bis(2-arboxyphenylthio) anthraquinone (25.60 g, 0.05 mole), 1,2-ethanediol dimethanesulfonate (10.90 g, 0.05 mole), potassium carbonate (13.82 g, 0.10 mole) and N-methyl-2-pyrrolidinone (NMP) (400 mL) was heated with sting at 125° C. for 1.0 hr. The reaction mixture was poured into methanol (600 mL) was stirring. The yellow polymeric product was collected by filtration and washed with methanol until filtrate was essentially clear. The methanol-wet filter cake was slurried in 1.0 L of water, the mixture acidified by the addition of acetic acid and the yellow product was collected by filtration, washed with hot water and dried in air (yield—21.16 g). By gel permeation chromatography (GPC) the polymeric product has a weight average molecular weight of 6,083, and number average molecular weight of 3,000 and a polydispersity value of 2.03.

EXAMPLE 4

To 99 parts Eastman AQ-375 (a linear, water dispersible polyester resin) was added 1 part of the poly(yellow) colorant prepared in Example 3 in powder form and 1 part $TiO_2$. This mixture was mixed thoroughly at 450° F. The melt viscosity of the mix was found to be 92,000 cP.

EXAMPLE 5

To 99 parts Eastman AQ-1350 (a branched, water dispersible polyester resi) was added 1 part of the poly(yellow) colorant prepared in Example 3 in powder form and 1 part $TiO_2$. This mixture was mixed thoroughly at 450° F. The melt viscosity was found to be 5,400 cP. This represents a significant reduction in melt viscosity corresponding to a increase in ease of compounding.

EXAMPLE 6

To 15 parts alkyd resign (Pentanox Resin, ring and ball softening point ca. 90–100° C.), 5 parts castor oil, 20 parts glass beads, 5 parts $TiO_2$ and 50 parts $CaCO_3$ (Georgia Marble) was added 5 parts of the mixture from Example 4. This gave a satisfactory traffic marking composition after vigorous mixing.

EXAMPLE 7

To 15 parts Alkyd Resin (Pentanox Resin, ring and ball softening point ca. 90–100° C.), 5 parts castor oil, 20 parts glass beads, 5 parts TiO$_2$ and 50 parts CaCO$_3$ (Georgia Marble) was added 5 parts of the mixture from Example 5. This gave satisfactory traffic marking composition with good flow characteristics and ease of mixing.

EXAMPLE 8

Preparation of 1,5-bis(1,2,4-triazo-3-yl thio)antbraquinone

A mixture of 77.87 parts 3-mercapto-1,2,4-triazole, 96.75 parts potassium carbonate, and 96.99 part 1,5-dichloranthraquinone in 1322 parts dimethylformamide (DMF) was stirred and heated to 100° C. and held at that temperature for 6 hours. The reaction mixture was then cooled to room temperature and poured into 4000 parts water. The mixture was acidified with HCl and then filtered on a medium frit filter. The solids were washed with water and dried. Typical yield is 85–90%.

EXAMPLE 9

Preparation of 1,5-bis(2-caTboxyphenylthio)anthraquinone

A mixture of 28 parts 1,5-dichloroantraquinone, 34 parts 2-mercaptobenzoic acid, 38 parts potassium carbonate in 750 parts diethylene glycol monopropyl ether was stirred and heated to reflux for 4 hours. The mixture was cooled to about 100° C. and drowned into 750 parts water. Acetic acid (50 parts) was added dropwise to precipitate the product The mixture was heated to 75° C. and filtered hot. The solids were washed repeatedly with hot water and then dried. Typical yield is 90–95%.

The claimed invention is:

1. A yellow, hot melt alkyd traffic marking composition comprising:

10–25 percent by weight of a hot melt alkyd binder,

5–10 percent by weight of a thermally stable 1,5- or 1,8-substituted anthraquinone colorant selected from the group consisting of a 1,5-substituted anthraguinone aromatic thioether, a 1,8-substituted anthraquinone aromatic thioether a 1,5-substituted anthraquinone aromatic thioether polyester and a 1,8-substituted anthraquinone aromatic thioether polyester, 30–85 weight percent of a filler, 0–30 weight percent of a reflectivity aid, 0–5 weight percent of a plasticizer, and 0–5 weight percent of an impact modifier.

2. A yellow, hot melt alkyd traffic marking composition of claim 1, further comprising:

15–25 weight percent of a reflectivity aid selected from the group consisting of glass beads, plastic beads, and plastic bubbles, 1–5 weight percent of a plasticizer, 2–5 weight percent of an impact modifier selected from the group consisting of polyethlene, polypropylene, and copolyethylene-propylene wherein the impact modifier has a Melt Index of 200 or less at 190° C.

3. A yellow, hot melt alkyd traffic marking composition of claim 1, wherein the 1,5- or 1,8-substituted anthraquinone colorant is a 1,5- or 1,8-substituted anthraquinone aromatic thioether of the formula:

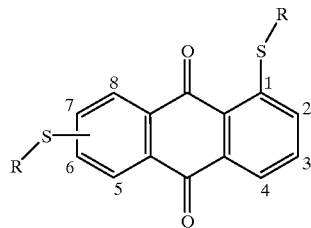

wherein R is

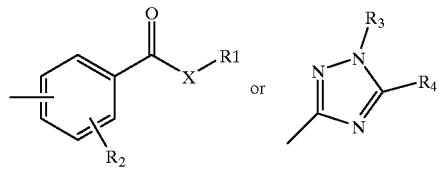

wherein R1 represents a branched or unbranched saturated hydrocarbon radical containing 6–20 carbon atoms and optionally containing one or more heteroatoms selected from oxygen, sir and nitrogen or a substituted phenyl group having the structure:

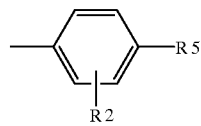

R2 is selected from the group consisting of hydrogen, C$_1$–C$_6$ alkyl, C$_1$–C$_6$ alkoxy, halogen and —COXR1; R3 represents a branched or unbranched saturated hydrocarbon radical containing 6–20 carbon atoms and optionally containing one or more heteroatoms selected from the group consisting of oxygen, sulfur and nitrogen; R4 is selected from the group consisting of hydrogen, C$_3$–C$_6$ cycloalkyl, C$_1$–C$_6$ alkyl and aryl; X is selected from the group consisting of —O—, —N(R1)—and —N(R4)—; R5 represents R3, —O—R3, —S—R3, —N(R1)R3, or —N(R4)R3.

4. A yellow, hot melt alkyd traffic marking composition of claim 3 wherein R is:

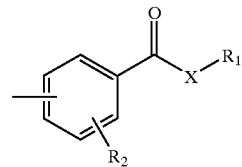

and wherein X is O—; R1 represents a branched or unbranched saturated hydrocarbon radical of 8–12 carbon atoms; R2 is hydrogen.

5. A yellow, hot melt alkyd traffic marking composition of claim 1, wherein the 1,5- or 1,8-substituted anthraquinone colorant is a 1,5- or 1,8-substituted anthraquinone aromatic thioether polyester having an 1,5- or 1,8-substituted anthraquinone repeat unit of the formula:

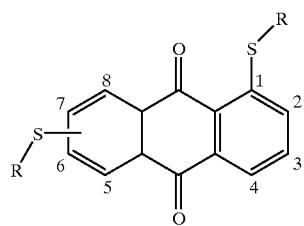

wherein R is:

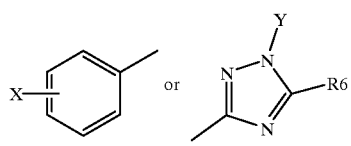

and wherein X is selected from the group consisting of —$CO_2R7$, —$(CH_2)_nCO_2R7$, $O(CH_2)_nCO_2R7$, —$(CH_2CH_2O)_mR8$, and —$(OCH_2CH_2)OR8$; Y is selected from the group consisting of —$(CH_2)_nCO_2R7$, —$CH_2$—$C_6H_4$—$CO_2R7$, and —$(CH_2CH_2O)_mR8$; R6 is selected from the group consisting of hydrogen, $C_1$–$C_6$ alkyl, and aryl; R7 is selected from the group consisting of hydrogen, $C_1$–$C_6$ alkyl, substituted $C_1$–$C_6$ alkyl, $C_3$–$C_8$ cycloalkyl, and aryl; R8 is selected from the group consisting of hydrogen and $C_1$–$C_6$ alkanoyloxy; m ranges from 1–3; and n ranges from 1–4; with the proviso that two polyester reactive groups selected from the group consisting of hydroxy, carboxy, carboxylic acid ester, and $C_1$–$C_6$ alkanoyloxy are present.

6. A yellow, hot melt alkyd traffic marking composition of claim 1, wherein the 1,5- or 1,8-substituted anthraquinone colorant is dispersed in a linear or branched water-dispersible polyester.

* * * * *